US008917592B2

(12) United States Patent
Tochio

(10) Patent No.: US 8,917,592 B2
(45) Date of Patent: Dec. 23, 2014

(54) COMMUNICATION APPARATUS, SYSTEM, AND METHOD

(75) Inventor: Yuji Tochio, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 288 days.

(21) Appl. No.: 13/045,075

(22) Filed: Mar. 10, 2011

(65) Prior Publication Data

US 2011/0222396 A1 Sep. 15, 2011

(30) Foreign Application Priority Data

Mar. 15, 2010 (JP) .................................. 2010-57229

(51) Int. Cl.
| *H04L 1/00* | (2006.01) |
| *H04L 12/701* | (2013.01) |
| *H04L 12/437* | (2006.01) |
| *H04L 12/24* | (2006.01) |
| *H04L 12/703* | (2013.01) |

(52) U.S. Cl.
CPC .............. *H04L 45/00* (2013.01); *H04L 12/437* (2013.01); *H04L 41/0668* (2013.01); *H04L 41/0681* (2013.01); *H04L 45/28* (2013.01)
USPC ....................................................... 370/222

(58) Field of Classification Search
CPC ....... H04L 12/437; H04L 12/42; H04J 3/085; H04J 2203/006; H04J 2203/0042
USPC ......... 370/222, 225, 218, 401, 406, 403, 238, 370/351, 252, 400, 498; 709/252, 224
See application file for complete search history.

(56) References Cited

U.S. PATENT DOCUMENTS 7,095,714 B2   8/2006 Suetsugu et al.
7,983,152 B1 * 7/2011 Sivasankaran et al. ....... 370/218
2002/0064166 A1 * 5/2002 Suetsugu et al. .............. 370/403
2009/0268746 A1  10/2009 Ogasahara et al.

FOREIGN PATENT DOCUMENTS

| JP | 2002-232442 A | 8/2002 |
| JP | 2005-130049 | 5/2005 |
| JP | 2005-354592 | 12/2005 |
| WO | WO 2007/077998 A1 | 7/2007 |
| WO | WO 2007/077998 A1 | 12/2007 |

OTHER PUBLICATIONS

Japanese Office Action issued Oct. 29, 2013 in Japanese Application No. 2010-057229, 4 pages (no English translation).
English translation of Japanese Office Action issued Oct. 29, 2013 in Japanese Application No. 2010-057229, which was previously filed without the English translation on Jan. 23, 2014, 4 pages.

* cited by examiner

*Primary Examiner* — Andrew Lai
*Assistant Examiner* — Jamaal Henson
(74) *Attorney, Agent, or Firm* — Oblon, Spivak, McClelland, Maier & Neustadt, L.L.P.

(57) ABSTRACT

A communication apparatus used as a first communication apparatus in a communication system having a ring network, the communication apparatus including: a storage unit configured to store information indicating a correspondence between a state of a path provided on the ring network, a state of a first link established between the first and third communication apparatuses, a state of a second link established between the second and third communication apparatuses, and a direction of forwarding the data; and a control unit configured to monitor links that are included in the ring network, and presence or absence of a failure occurring in each of the first and second links, and determine a direction of forwarding data to which path identification information corresponding to the third communication apparatus is added based on a result of the monitoring and the information stored in the storage unit.

13 Claims, 19 Drawing Sheets

FIG. 4

| PATH | RING STATE | DH STATE | | TRANSMISSION DIRECTION | RECEPTION DIRECTION |
| --- | --- | --- | --- | --- | --- |
| | | OWN LINK | OTHER LINK | | |
| Pa | REGULAR | NORMAL | (ARBITRARY) | W | T |
| | REGULAR | FAILURE | NORMAL | W | E |
| | STANDBY | (ARBITRARY) | NORMAL | (ARBITRARY OR ABANDON) | |
| | STANDBY | NORMAL | FAILURE | E | T |
| | (ARBITRARY) | FAILURE | FAILURE | (ARBITRARY OR ABANDON) | |

| PATH | RING STATE | DH STATE | | TRANSMISSION DIRECTION | RECEPTION DIRECTION |
|---|---|---|---|---|---|
| | | OWN LINK | OTHER LINK | | |
| Pa | REGULAR | (ARBITRARY) | NORMAL | (ARBITRARY OR ABANDON) | |
| | REGULAR | NORMAL | FAILURE | W | T |
| | STANDBY | NORMAL | (ARBITRARY) | E | T |
| | STANDBY | FAILURE | NORMAL | E | W |
| | (ARBITRARY) | FAILURE | FAILURE | (ARBITRARY OR ABANDON) | |

| PATH | RING STATE | DH STATE | | TRANSMISSION DIRECTION | RECEPTION DIRECTION |
| --- | --- | --- | --- | --- | --- |
| | | OWN LINK | OTHER LINK | | |
| Pa | REGULAR | NORMAL | (ARBITRARY) | W | T |
| | REGULAR | FAILURE | NORMAL | (N/A) | |
| | STANDBY | NORMAL | NORMAL | (ARBITRARY OR ABANDON) | |
| | STANDBY | NORMAL | FAILURE | E | T |
| | STANDBY | FAILURE | NORMAL | (ARBITRARY OR ABANDON) | |
| | (ARBITRARY) | FAILURE | FAILURE | (ARBITRARY OR ABANDON) | |

| PATH | RING STATE | DH STATE | | TRANSMISSION DIRECTION | RECEPTION DIRECTION |
|---|---|---|---|---|---|
| | | OWN LINK | OTHER LINK | | |
| Pa | REGULAR | (ARBITRARY) | NORMAL | (ARBITRARY OR ABANDON) | |
| | REGULAR | NORMAL | FAILURE | (N/A) | |
| | STANDBY | NORMAL | NORMAL | E | T |
| | STANDBY | FAILURE | NORMAL | E | W |
| | STANDBY | NORMAL | FAILURE | E | T |
| | (ARBITRARY) | FAILURE | FAILURE | (ARBITRARY OR ABANDON) | |

18d

COMMUNICATION APPARATUS, SYSTEM, AND METHOD

CROSS-REFERENCE TO RELATED APPLICATION

This application is based upon and claims the benefit of priority from the prior Japanese Patent Application No. 2010-57229 filed on Mar. 15, 2010, the entire contents of which are incorporated herein by reference.

FIELD

The present invention relates to a communication apparatus used for a ring network, a communication system including the ring network, and a communication method used therefor.

BACKGROUND

A ring network including a plurality of nodes provided as communication apparatuses that are coupled in a ring-like manner has been achieved as one of network connection configurations. The data forwarding technology of Ethernet (Registered Trademark) can be applied for the ring network. In that case, data is forwarded between the nodes as a frame of Ethernet. The ring network which allows for efficient wiring by establishing links between the nodes has often been used as a wide-area network.

The failure recovery technology referred to as ring protection has been used as a technology relating to the ring network. The ring protection system is stipulated in, for example, International Telecommunication Union-Telecommunication standardization sector (ITU-T) Recommendation G.8032.

According to the ring protection system stipulated in ITU-T Recommendation G.8032, one of the nodes that are provided on the ring network is specified as a master node. The master node includes a blocking port (BP) which does not let a frame pass there through to avoid the frame circulation. When a failure occurs in a certain link in that state, failure notification-message data is forwarded between the nodes. Upon receiving the failure notification-message data, the master node opens the BP to let the frame pass there through. Accordingly, a forwarding route which allows for detouring round the link where the failure occurs is ensured. Here, according to ITU-T Recommendation G.8032, a frame forwarded in a connectionless manner is the object to be protected.

Further, the ring network may include an end-to-end path so that a frame is forwarded over the path corresponding to path identification information added to the frame. The above-described data forwarding method can be achieved by using, for example, the virtual local area network (VLAN) technology of Ethernet. The path identification information may be a VLAN identifier, a pair of the VLAN identifier and a media access control (MAC) address, etc. In that case, each of the nodes that are provided on the ring network performs the frame switching based on the path identification information, which indicates that each of the nodes may not learn the address of the frame.

As a technology relating to failure recovery performed in the ring network, providing a route used when a failure occurs in a ring part and that used when a failure occurs in a connection part in a compatible and harmonious manner in a system including two ring networks that are coupled to each other via a plurality of the connection parts has been proposed (see paragraph [0015] of Japanese Unexamined Patent Application Publication No. 2002-232442, for example).

SUMMARY

According to an aspect of the invention, a communication apparatus used as a first communication apparatus in a communication system having a ring network that includes the first communication apparatus and a second communication apparatus and that is configured to forward data over a path corresponding to path identification information added to the data, and a third communication apparatus provided outside the ring network, the third communication apparatus being coupled to each of the first and second communication apparatuses, the communication apparatus including: a storage unit configured to store information indicating a correspondence between a state of a path provided on the ring network, a state of a first link established between the first and third communication apparatuses, a state of a second link established between the second and third communication apparatuses, and a direction of forwarding the data; and a control unit configured to monitor links that are included in the ring network, and presence or absence of a failure occurring in each of the first and second links, and determine a direction of forwarding data to which path identification information corresponding to the third communication apparatus is added based on a result of the monitoring and the information stored in the storage unit.

The object and advantages of the invention will be realized and attained by at least the elements, features, and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 illustrates a first example forwarding table data according to a second embodiment.

FIG. 5 illustrates a second example forwarding table data according to the second embodiment.

FIG. 13 illustrates a first example forwarding table data according to a third embodiment.

FIG. 14 illustrates a second example forwarding table data according to the third embodiment.

DESCRIPTION OF EMBODIMENTS

A dual-home (DH) connection has been performed as one of configurations that are used to couple a node provided outside a ring network (an external node) to the ring network. The DH connection allows for coupling the external node to a plurality of (e.g., two) nodes provided on the ring network. However, when forwarding data of the DH-coupled external node over an end-to-end path provided on the ring network, the following problems arise.

That is, when the direction of forwarding the data of the external node is fixed with the plurality of nodes provided on the ring network coupled to the external node, the data may be forwarded through a roundabout route depending on the state (counterclockwise, clockwise, etc.) of the path provided on the ring network. For example, supposing that the external node is DH-coupled to nodes #1 and #2 that are provided on the ring network, the node #1 drops data which should be transmitted to the external node outside the ring network, and the state of the path provided on the ring network is different from expected (e.g., the path is the opposite of expected), the data may be forwarded from the node #2 to the node #1 even though the forward distance becomes longer than in the case where the node #2 drops the data.

Further, when a failure occurs in part of a plurality of links provided between the ring network and the external node, forwarding the data of the external node in a fixed direction may cause the problem of how to recover from the failure.

Accordingly, the present invention has been achieved to provide a communication apparatus, a communication system, and a communication method that can appropriately determine a data-forwarding route when an external node is coupled to a plurality of nodes provided on a ring network.

Hereinafter, embodiments will be described in detail with reference to the attached drawings.

First Embodiment

Figure 1:
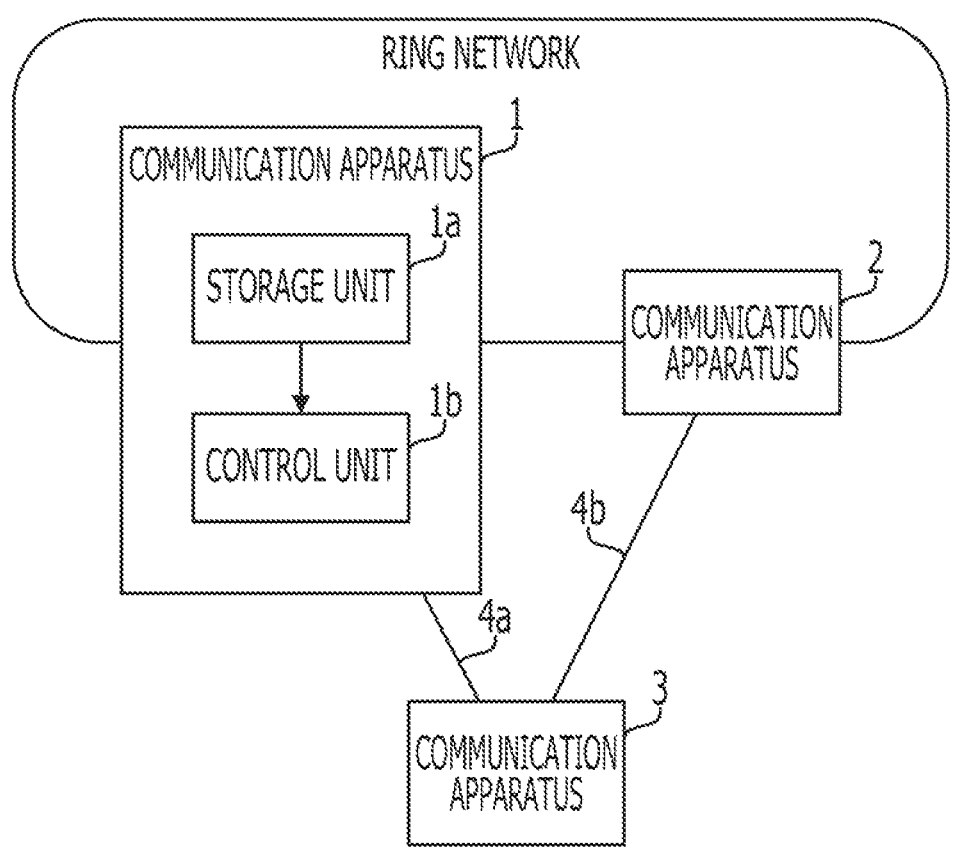
FIG. 1 illustrates a communication system according to a first embodiment.

FIG. 1 illustrates a communication system according to a first embodiment, which includes communication apparatuses 1 to 3.

Each of the communication apparatuses 1 and 2 is a communication apparatus included in a ring network, and the communication apparatuses 1 and 2 are coupled to each other with a link. Another communication apparatus may be provided between the communication apparatuses 1 and 2. The communication apparatus 3 is installed outside the ring network, and is coupled to the communication apparatuses 1 and 2 with links 4a and 4b, respectively. The communication apparatus 3 may be coupled to at least three communication apparatuses that are included in the ring network. When path identification information (e.g., a VLAN identifier) is added to data forwarded across the ring network, the data is forwarded over the path corresponding to the path identification information.

The communication apparatus 1 includes a storage unit 1a and a control unit 1b.

The storage unit 1a stores information indicating the correspondence between the state of a path provided on the ring network, the state of each of the links 4a and 4b, and the direction of forwarding data. The correspondence information may be set for each path identification information.

The state of the path provided on the ring network may be either a regular path state or a standby path state, for example. In the regular path state, the data with the added path identification information is forwarded through an original route. The standby path state denotes the state where the forwarding route is changed (so as to be opposite in direction to the original route) by the ring protection. Further, the state of each of the links 4a and 4b may be either a normal state or a failure state.

The control unit 1b monitors the presence or absence of a failure occurring in each of links that are included in the ring network, and the links 4a and 4b. Then, the control unit 1b determines the direction of forwarding the data with the added path identification information corresponding to the communication apparatus 3 based on the failure condition recognized through the monitoring and the correspondence information stored in the storage unit 1a.

For example, the control unit 1b determines the failure condition of the ring network based on failure notification-message data transmitted from a different communication apparatus. The control unit 1b may determine whether or not the path state should be switched from the regular path state to the standby path state based on the state of receiving the failure notification-message data. Further, the control unit 1b can monitor the presence or absence of the failure occurring in each of the links 4a and 4b by providing a management path extending via the section of the link 4a, a section provided between the communication apparatuses 1 and 2, and the section of the link 4b. It can be considered that both the start point and the end point of the management path are set in the communication apparatus 3 and a virtual connection is set in the section provided between the communication apparatuses 1 and 2. Accordingly, the failure notification-message data indicating that a failure detected from the link 4b is transmitted from the communication apparatus 2 to the control unit 1b.

In the above-described communication system according to the first embodiment, the communication apparatus 1 monitors the presence or absence of a failure occurring in the links that are included in the ring network, and each of the links 4a and 4b. Then, the communication apparatus 1 performs a control so that the data with the added path identification information corresponding to the communication apparatus 3 is forwarded toward the direction corresponding to the monitoring result. The communication apparatus 2 can also perform the same control as that of the communication apparatus 1. Accordingly, a forwarding route through which data is transmitted from and/or to the communication apparatus 3 can be appropriately controlled. That is, the control can inhibit the forwarding route from becoming a roundabout route and set a detour route when a failure occurs in the link 4a and/or the link 4b. Further, a route control can be performed on the side of the links 4a and 4b without affecting the procedures of controlling the path state achieved on the ring side.

For example, under the assumption that data transmitted to the communication apparatus 3 is forwarded counterclockwise in the regular path state and is forwarded clockwise in the standby path state, the communication apparatus 1 drops the data when the regular path state is attained and the link 4a is under normal conditions. When the regular path state is attained and a failure occurs in the link 4a, the communication apparatus 1 forwards the data to the communication apparatus 2, and the communication apparatus 2 drops the data. Further, when the standby path state is attained and the link 4b is under the normal conditions, the communication apparatus 2 drops the data. When the standby path is attained and a failure occurs in the link 4b, the communication apparatus 2 forwards the data to the communication apparatus 1, and the communication apparatus 1 drops the data.

Further, each of the communication apparatuses 1 and 2 can also control the direction of forwarding the data transmitted from the communication apparatus 3 in the above-described manner. At the transmission time, the communication apparatus 3 may transmit the data to both of the communication apparatuses 1 and 2, and either of the communication apparatuses 1 and 2 may abandon the transmitted data. Thus, each of the communication apparatuses 1 and 2 can appropriately determine the direction of forwarding data transmitted from or to the communication apparatus 3 based on the state of a path provided on the ring network and the state of each of the links 4a and 4b.

Second Embodiment

Figure 2:
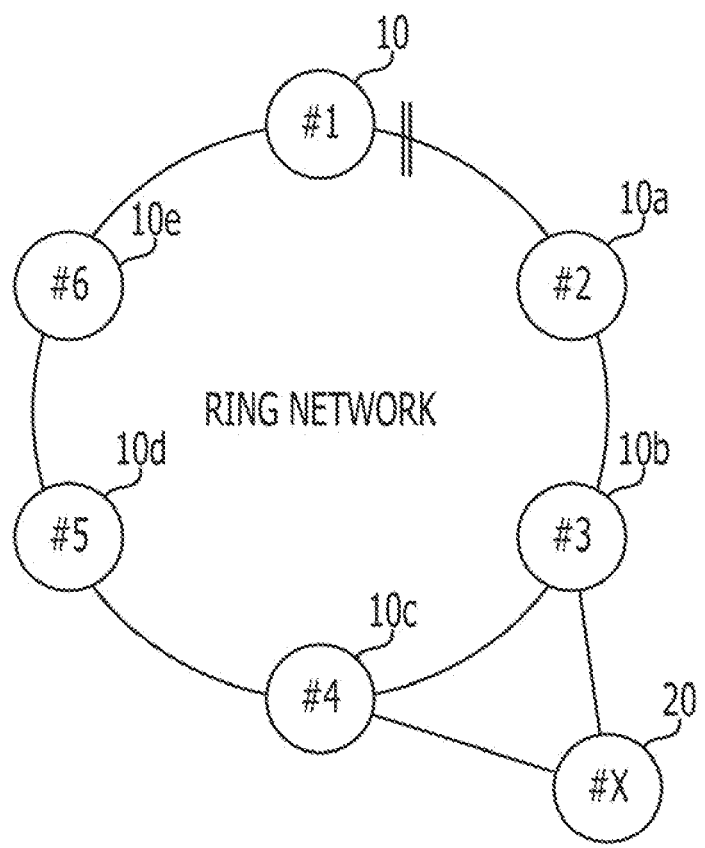
FIG. 2 illustrates a communication system according to a second embodiment.

FIG. 2 illustrates a communication system according to a second embodiment, the communication system including communication apparatuses 10, 10a, 10b, 10c, 10d, 10e, and 20. Each of the communication apparatuses 10, 10a, 10b, 10c, 10d, and 10e (hereinafter often referred to as nodes #1 to #6) is a node provided on the ring. The communication apparatus 20 (hereinafter often referred to as a node #X) is installed outside the ring and is DH-coupled to the nodes #3 and #4 that are provided on the ring.

Each of the nodes #1 to #6 receives control information including data of the frame form, operation administration and maintenance (OAM) information, etc., and forwards the control information to an adjacent node. Each of the nodes #1 to #6 forwards a frame by using the data forwarding technology of Ethernet, for example. A data frame includes the main body of data (a main signal), a VLAN-ID (also referred to as a VID) provided as the path identification information, and MAC address data illustrating the transmission source and the destination. Each of the nodes #1 to #6 determines the direction of forwarding the data frame on referring to the VID included in the data frame.

The ring network has a failure recovery function performed under the ring protection system (e.g., a function stipulated in Recommendation ITU-T G.8032). The node #1 is designated as a master node. The node #1 determines a port provided on the node #2-side to be a blocking port (BP) in normal times where no failure occurs, so as to avoid the frame circulation. The BP blocks the data frame and/or an OAM frame.

At the failure-occurrence time, the failure notification-message data and/or switching inhibit-message data flows on the ring as a control frame. For example, when a failure occurs in a link established between the nodes #5 and #6, the node #5 detects the failure and transmits the failure notification-message data in the counterclockwise direction (hereinafter often referred to as the east (E) direction). Further, the node #6 detects the failure and transmits the failure notification-message data in the clockwise direction (hereinafter often referred to as the west (W) direction). Upon receiving the failure notification-message data, the node #1 opens the BP and retains a route through which the data can detour around the link where the failure occurs.

Further, at the failure-occurrence time, each of the nodes #1 to #6 makes a determination for each path, that is, makes a determination of whether or not the state of the path corresponding to the VID should be changed (whether to maintain the regular path state or switch over to the standby path state) based on the failure notification-message data and/or the switching inhibit-message data. The path is an end-to-end path extending from a node to which a data frame is transmitted from outside the ring (often referred to as a starting-point node) to a node that drops the data frame outside the ring (often referred to as an end-point node).

Figure 3:
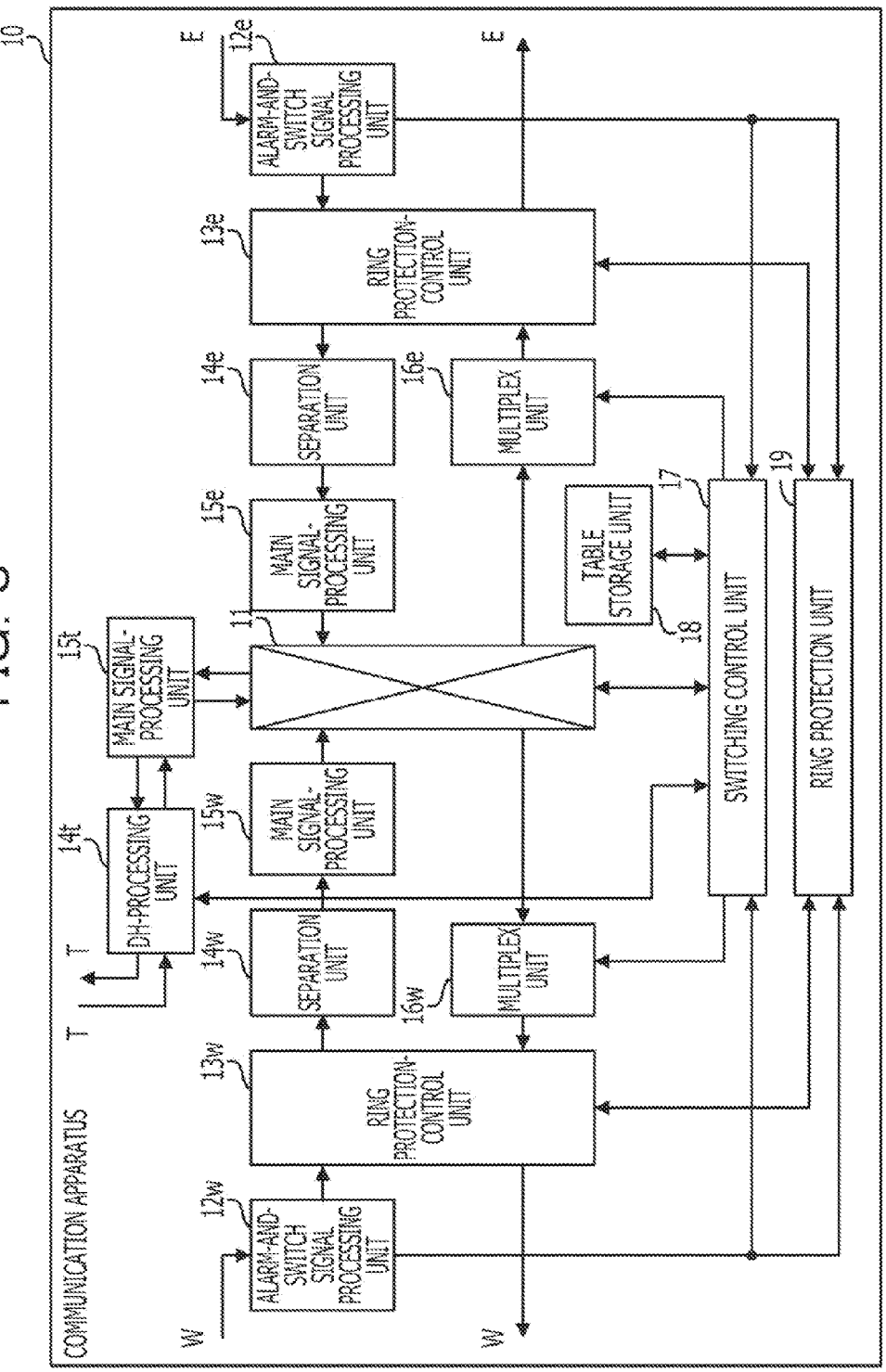
FIG. 3 is a block diagram illustrating a communication apparatus.

FIG. 3 is a block diagram illustrating a communication apparatus 10 including a switch 11, alarm-and-switch signal processing units 12e and 12w, ring protection-control units 13e and 13W, separation units 14e and 14w, a DH-processing unit 14t, main signal-processing units 15e, 15t, and 15w, multiplex units 16e and 16w, a switching control unit 17, a table storage unit 18, and a ring protection unit 19. Each of other communication apparatuses that are provided on the ring (the nodes #2 to #6) can also have the same configuration as that of the communication apparatus 10.

The switch 11 is provided in the communication apparatus 10 to distribute a main signal based on an instruction transmitted from the switching control unit 17. The switch 11 acquires a main signal from the main signal-processing unit 15e, the main signal being transmitted from the E direction, acquires a main signal from the main signal-processing unit 15w, the main signal being transmitted from the W direction, and acquires a main signal from the main signal-processing unit 15t, the main signal being transmitted from outside the ring (the tributary (T) direction). Further, the switch 11 outputs a main signal which should be transmitted toward the E direction to the multiplex unit 16e, outputs a main signal which should be transmitted toward the W direction to the multiplex unit 16w, and outputs a main signal which should be transmitted toward the T direction to the main signal-processing unit 15t.

The alarm-and-switch signal processing unit 12e is coupled to a port facing toward the E direction. The alarm-and-switch signal processing unit 12e acquires a frame transmitted from the E direction and determines the type of the frame. Then, the alarm-and-switch signal processing unit 12e outputs a control frame relating to the ring protection (including the failure notification-message data and/or the switching inhibit-message data) to the switching control unit 17 and the ring protection unit 19, and outputs OAM message data relating to the DH connection, which will be described later, to the switching control unit 17. Further, the alarm-and-switch signal processing unit 12e transmits a data frame to the ring protection-control unit 13e. Further, upon detecting a failure occurring in a link established in the E direction, the alarm-and-switch signal processing unit 12e notifies the switching control unit 17 and the ring protection unit 19 of the failure occurrence. The alarm-and-switch signal processing unit 12w performs the same processing procedures as those performed for the E direction for the W direction.

The ring protection-control unit 13e controls the opening and closing of the port, which are performed in association with the ring protection, based on an instruction transmitted from the ring protection-control unit 19. When the port facing toward the E direction is not the BP, the ring protection-control unit 13e outputs the data frame acquired from the alarm-and-switch signal processing unit 12e to the separation unit 14e. Further, when the link established in the E direction is under normal conditions, the ring protection-control unit 13e acquires a data frame and/or a control frame from the multiplex unit 16e and transmits the data frame and/or the control frame toward the E direction. The ring protection-control unit 13w performs the same processing procedures as those performed for the E direction for the W direction.

The separation unit 14e extracts a VID included in the data frame acquired from the ring protection-control unit 13e and confirms whether or not the VID indicates a path running through the communication apparatus 10 (e.g., a path registered with the table storage unit 18). When the VID indicates the path running through the communication apparatus 10, the separation unit 14e outputs the data frame to the main signal-processing unit 15e. The description of processing performed for a data frame which does not satisfy the above-described condition is omitted in the present embodiment. The separation unit 14w performs the same processing procedures as those performed for the E direction for the W direction.

The DH-processing unit 14t is coupled to a port facing toward the T direction. The DH-processing unit 14t outputs a data frame transmitted from the T direction to the main signal-processing unit 15t. Further, the DH-processing unit 14t transmits a data frame acquired from the main signal-processing unit 15t toward the T direction. Further, upon detecting a failure occurring in a link established in the T direction, the DH-processing unit 14t notifies the switching control unit 17 of the failure occurrence.

The main-signal processing unit 15e extracts a main signal included in the data frame acquired from the separation unit 14e, and outputs the main signal to the switch 11. The main-signal processing unit 15w performs the same processing procedures as those performed for the E direction for the W direction. The main signal-processing unit 15t extracts a main signal included in the data frame acquired from the DH-processing unit 14t, and outputs the main signal to the switch 11. Further, the main signal-processing unit 15t outputs a data frame including the main signal acquired from the switch 11 to the DH-processing unit 14t.

The multiplex unit 16e outputs a data frame including the main signal acquired from the switch 11 to the ring protection-control unit 13e. The multiplex unit 16e further outputs a control frame (including the failure notification-message data and/or the switching inhibit-message data) acquired from the switching control unit 17 to the ring protection-control unit 13e. The multiplex unit 16w performs the same processing procedures as those performed for the E direction for the W direction.

The switching control unit 17 determines the forward destinations of data frames, each of which includes a VID, on a VID-to-VID basis by referring to forwarding table data stored in the table storage unit 18. Then, the switching control unit 17 instructs the switch 11 to distribute the main signal based on the determination result.

More specifically, the switching control unit 17 determines whether to maintain the regular path state or switch over to the standby path state based on a VID-to-VID basis in accordance with failure notification-message data and/or switching inhibit-message data acquired from each of the alarm-and-switch signal processing units 12e and 12w. Further, the switching control unit 17 monitors whether or not a link established in the T direction is under normal conditions based on notification data transmitted from the DH-processing unit 14t, and monitors whether or not other DH-coupled links are under normal conditions based on OAM-message data acquired from either of the alarm-and-switch signal processing units 12e and 12w. Then, the switching control unit 17 searches through the forwarding table data for the forward direction corresponding to the state path and the DH link state.

Further, the switching-control unit 17 forwards the acquired failure notification-message data and/or switching inhibit-message data to a different node provided on the ring via either of the multiplex units 16e and 16w. Further, the switching control unit 17 transmits OAM message data indicating the state of the link established in the T direction to a different DH-coupled node provided on the ring.

The table-storage unit 18 is a storage medium storing the forwarding table data, such as a nonvolatile memory. Information about the correspondence between the path state, the DH link state, the direction of forwarding a data frame is registered with the forwarding table data for each path (e.g., for each VID). Information registered with the forwarding table data is transmitted by, for example, an administrator of the ring network.

The ring protection unit 19 monitors whether or not a link established in the E direction and that established in the W direction are under normal conditions based on notifications that are transmitted from the alarm-and-switch signal processing units 12e and 12w. Upon detecting a failure occurring in either the link established in the E direction or that established in the W direction, the ring protection unit 19 performs a control so that the failure notification-message data is transmitted toward the opposite direction. Further, upon receiving the failure notification-message data transmitted from at least one of the alarm-and-switch signal processing units 12e and 12w when the communication apparatus 10 is the master node, the ring protection unit 19 instructs either of the ring protection-control units 13e and 13w to open the BP.

FIG. 4 illustrates a first example forwarding table data 18a according to the second embodiment. The forwarding table data 18a is expected to be stored in a table storage unit (corresponding to the table storage unit 18) of the communication apparatus 10c. The forwarding table data 18a includes data organized into categories "PATH", "RING STATE", "DH STATE", "TRANSMISSION DIRECTION", AND "RECEPTION DIRECTION".

The path identification information (e.g., a VID) is illustrated in the category "PATH". In the category "RING STATE", the term "REGULAR" or the term "STANDBY" is entered, as the state of a path provided on the ring. However, when the path state can be either of the regular state and the standby state, the term "ARBITRARY" is entered. In the category "DH STATE", the term "NORMAL" or the term "FAILURE" is entered as the state of each of links that are established between the node #X installed outside the ring, and the nodes #3 and #4 that are provided on the ring. However, when the DH state can be either of the normal state and the failure state, the term "ARBITRARY" is entered.

In the category "TRANSMISSION DIRECTION", the sign "W" or "E" is entered as the direction of forwarding a data frame transmitted from the node #X installed outside the ring. In the category "RECEPTION DIRECTION", one of the signs "T", "E", and "W" is entered as the direction of forwarding a data frame that should be transmitted to the node #X installed outside the ring. However, when the data frame may not be forwarded, the terms "ARBITRARY or ABANDON" are entered. Here, the transmission direction and the reception direction may be determined based on information provided to identify an output port (e.g., a port number) in place of the signs "E", "W", and "T".

When a regular path is retained and the link established between the nodes #X and #4 is under normal conditions, the node #4 forwards a data frame between the nodes #5 and #X. When a failure occurs between the nodes #X and #4 and the link established between the nodes #X and #3 is under normal conditions, the data frame is forwarded between the nodes #3 and #5. On the other hand, when the path is changed over to a standby path and the link established between the nodes #X and #3 is under normal conditions, the data frame may not be forwarded. When a failure occurs between the nodes #X and #3, and the link established between the nodes #X and #4 is under normal conditions, the data frame is forwarded between the nodes #X and #3. When each of the DH links is under fault conditions, the data frame may not be forwarded.

FIG. 5 illustrates a second example forwarding table data 18b according to the second embodiment. The forwarding table data 18b illustrated in FIG. 5 is expected to be stored in a table storage unit (corresponding to the table storage unit 18) of the communication apparatus 10b. The forwarding table data 18b includes data organized into the categories "PATH", "RING STATE", "DH STATE", "TRANSMISSION DIRECTION", AND "RECEPTION DIRECTION" as is the case with the forwarding table data 18a.

When the regular path is retained and the link established between the nodes #X and #4 is under normal conditions, the node #3 may not forward the data frame. When a failure occurs between the nodes #X and #4 and the link established between the nodes #X and #3 is under normal conditions, the data frame is forwarded between the nodes #4 and #X. On the other hand, when the path is changed over to the standby path, and the link established between the nodes #X and #3 is under normal conditions, the data frame is forwarded between the nodes #2 and #X. When a failure occurs between the nodes #X and #3, and the link established between the nodes #X and #4 is under normal conditions, the data frame is forwarded between the nodes #2 and #4. When each of the DH links is under fault conditions, the data frame may not be forwarded.

Figure 6:
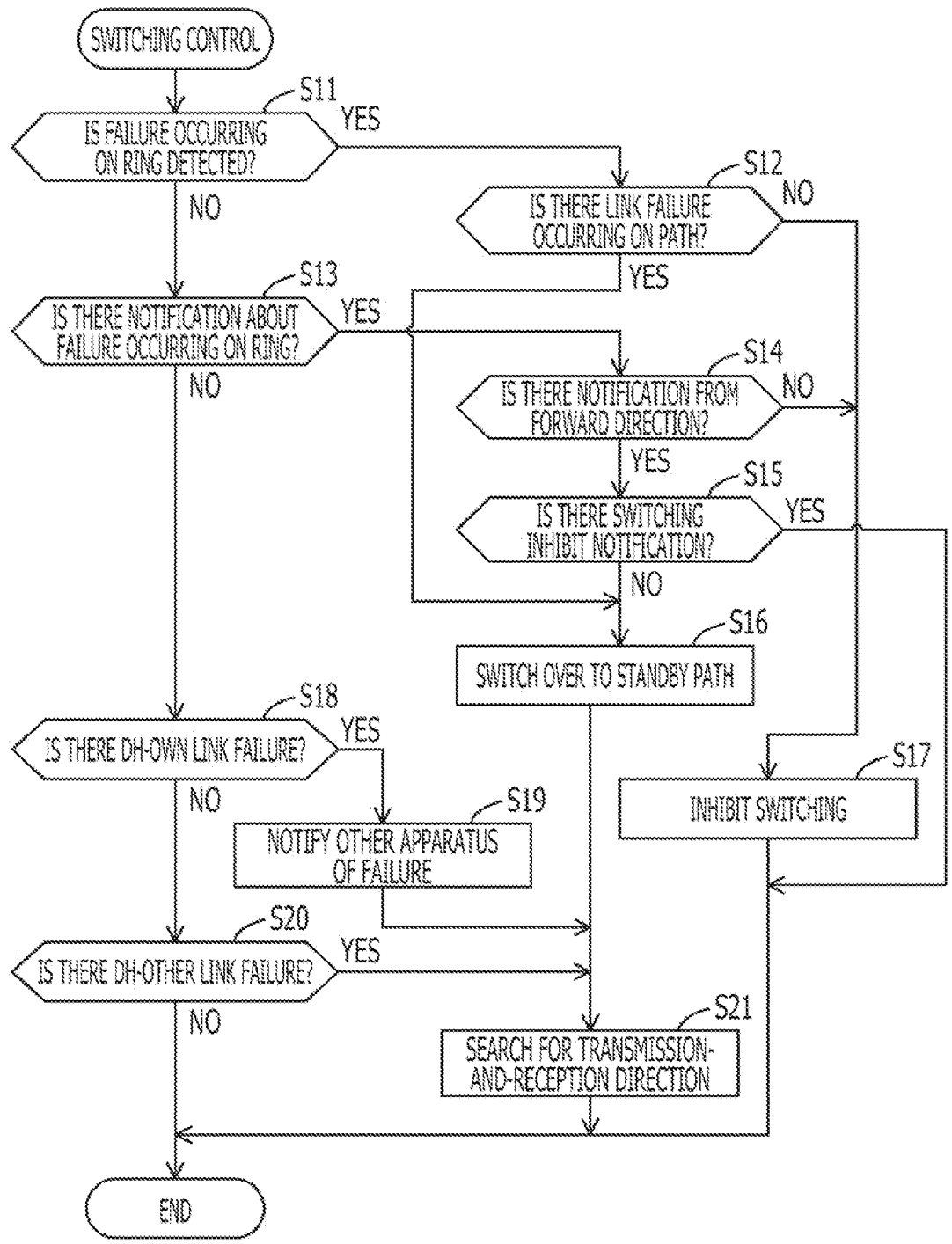
FIG. 6 is a flowchart illustrating a main signal-switching control performed according to the second embodiment.

FIG. 6 is a flowchart illustrating a main-signal switching control performed according to the second embodiment. Here, a switching control unit (corresponding to the switching control unit 17) of the communication apparatus 10c performs the main signal-switching control illustrated in FIG. 6. Substantially the same processing procedures as those illustrated in the flowchart may be performed with other communication apparatuses that are installed on the ring. Hereinafter, the processing procedures that are illustrated in FIG. 6 will be described in order of the operation numbers.

(Operation (S11)) The communication apparatus 10c determines whether or not a failure is detected from a link established in the E direction (the link established between the nodes #3 and #4) or that provided in the W direction (the link established between the nodes #4 and #5). When the failure is detected, the communication apparatus 10c transmits the failure notification-message data to an adjacent node installed on the ring, and the processing advances to operation (S12). When no failure is detected, the processing advances to operation (S13).

(Operation (S12)) The communication apparatus 10c determines whether or not the link where the failure is detected at operation (S11) is included in the current forwarding route through which the data frame of the node #X is forwarded by referring to the forwarding table data 18a. When the link is included in the current forwarding route, the processing advances to operation (S16). Otherwise, the processing advances to operation (S17).

(Operation (S13)) The communication apparatus 10c determines whether or not a failure is detected from a link established on the ring, the link being not directly coupled to its own apparatus, that is, whether or not the failure notification-message data relating to the ring protection is transmitted from the adjacent node #3 and/or the adjacent node #5. When the failure notification-message data is transmitted, the message data is forwarded to an adjacent node installed on the opposite side of the ring, and the processing advances to operation (S14). Otherwise, the processing advances to operation (S18).

(Operation (S14)) The communication apparatus 10c determines whether or not the direction from which the failure notification-message data is transmitted at operation (S13) is included in the current direction of forwarding the data frame of the node #X (the transmission direction or the reception direction) by referring to the forwarding table data 18a. If the direction is included in the current forwarding direction, the processing advances to operation (S15). Otherwise, the processing advances to operation (S17).

(Operation (S15)) The communication apparatus 10c determines whether or not the switching inhibit-message data is transmitted thereto within a specified time period after the failure notification-message data is transmitted thereto at operation (S13). When the switching inhibit-message data is transmitted to the communication apparatus 10c, the switching inhibit-message data is forwarded to an adjacent node installed on the opposite side of the ring, and the processing is terminated. Otherwise, the processing advances to operation (S16).

(Operation (S16)) The communication apparatus 10c determines to switch the path state of the node #X from the regular path state to the standby path state. Then, the processing advances to operation (S21).

(Operation (S17)) The communication apparatus 10c determines to retain the current path state of the node #X, that is, the regular path state. Then, the communication apparatus 10c transmits the switching inhibit-message data toward the same direction as that in which the failure notification-message data is transmitted at operation (S11) or operation (S13), and terminates the processing.

(Operation (S18)) The communication apparatus 10c determines whether or not a failure is detected from a link determined to be its own link with respect to the DH-connection (the link established between the nodes #4 and #X). When the failure is detected, the processing advances to operation (S19). Otherwise, the processing advances to operation (S20).

(Operation (S19)) The communication apparatus 10c transmits the failure notification-message data to the other communication apparatus (the node #3) that is installed on the ring and that pairs up with its own apparatus with respect to the DH-connection. Then, the processing advances to operation (S21).

(Operation (S20)) The communication apparatus 10c determines whether or not a failure is detected from a link determined to be the other link with respect to the DH-connection (the link established between the nodes #3 and #X), that is, whether or not the failure notification-message data relating to the DH-connection is transmitted from the other apparatus. When the failure notification-message data is transmitted to the communication apparatus 10c, the processing advances to operation (S21). Otherwise, the processing is terminated. The method of monitoring the other link will be described later.

(Operation (S21)) The communication apparatus 10c specifies a group of the path state achieved after being changed, the state of its own link relating to the DH-connection, and the state of the other link relating to the DH-connection. Then, the communication apparatus 10c searches across the forwarding table data 18a and determines the forward direction (the transmission direction and the reception direction) corresponding to the above-described group. From then on, the communication apparatus 10c forwards a data frame transmitted to and/or from the node #X toward the determined forward direction.

Figure 7:
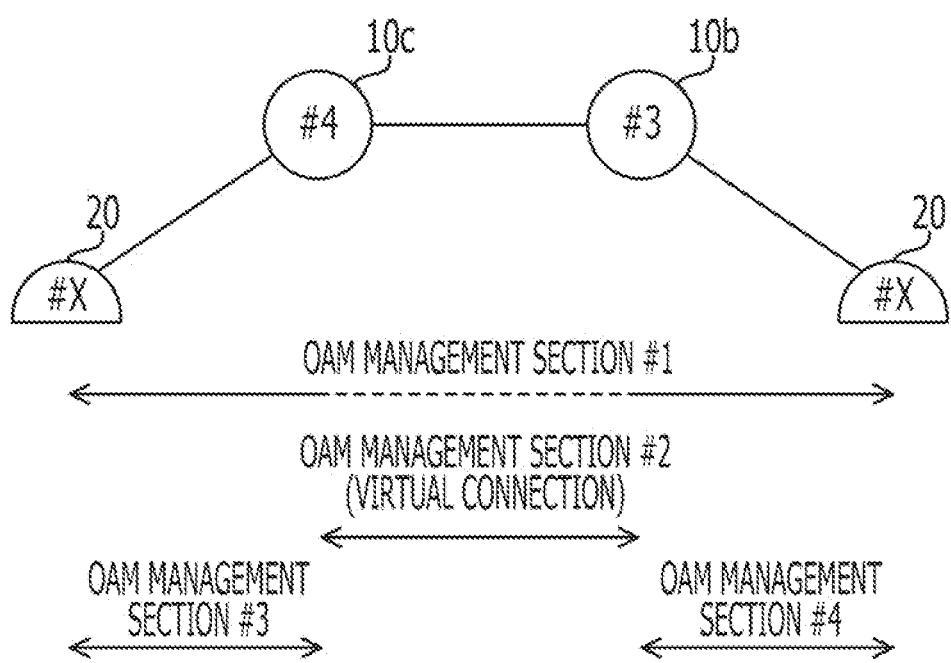
FIG. 7 illustrates a method of providing a management path.

FIG. 7 illustrates the method of providing a management path. The nodes #3 and #4 determine the management path illustrated in FIG. 7 so that the node #3 can recognize the state of the link established between the nodes #4 and #X, and the node #4 can recognize the state of the link established between the nodes #3 and #X. Consequently, it becomes possible to integrally manage the links of the DH-connection part.

That is, an end-to-end management path is set in a series of OAM management sections which starts from the node #X and returns to node #X via the nodes #3 and #4. In FIG. 7, the node #X is divided into two parts for the sake of description. In the OAM management section #1, an OAM management section #2 provided between the nodes #3 and #4, an OAM management section #3 provided between the nodes #4 and #X, and an OAM management section #4 provided between the nodes #3 and #X are included in hierarchical manner.

The OAM management section #2, which overlaps the ring, includes a connection provided to virtually couple the OAM management sections #3 and #4 with each other. Consequently, the OAM management section #2 can be handled transmissively. The method of achieving the virtual connection may include the method of providing a VLAN by assigning a VID to the OAM management section #2, the method of assigning a tag protocol ID (TPID) to the OAM management section #2 and providing a frame with an identifier such as a multi protocol label switching (MPLS) label, and so forth. The virtual connection may be provided even though a different node (other than the master node) is installed between the nodes #3 and #4.

Technologies that are disclosed in "ITU-T Recommendation Y.1731", "IEEE802.1ag", "Technical Specification Metro Ethernet Forum (MEF) 17", "Internet Engineering Task Force (IETF) draft "draft-ietf-pwe3-mpls-eth-oam-iwk-00" (November 2007)", etc. may be applied to achieve the above-described management path.

For example, a VID is assigned to the OAM management section #2. No VID may be assigned to each of the OAM management sections #3 and #4. Further, the OAM management section #1, the OAM management section #2, and the OAM management sections #3 and #4 are associated with subscriber ME (maintenance entity) and operator ME, and UNI-ME that are stipulated in the "Technical Specification MEF 17", respectively. A maintenance entity group level (MEL) is given to each of the OAM management sections #1 to #4, where the relation MEL of OAM management section #1>MEL of OAM management section #2>MELs of OAM management sections #3 and #4 holds. Then, data of an OAM message stipulated in "ITU-T Recommendation Y.1731" and/or "IEEE802.1ag" is forwarded between the OAM management sections #1 to #4.

Figure 8:
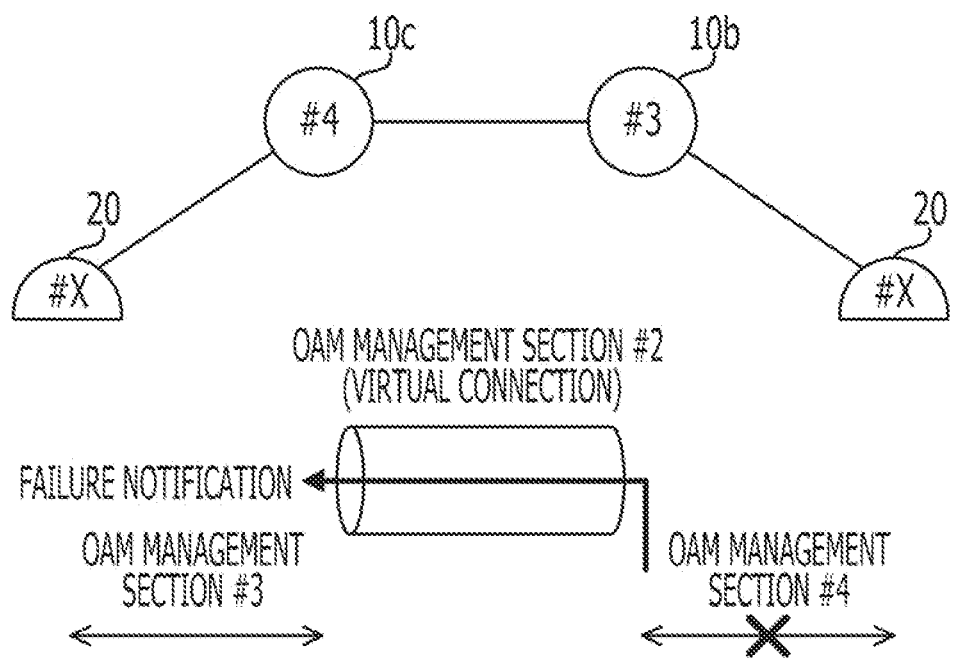
FIG. 8 illustrates a method of detecting a failure occurring in a DH link.

FIG. 8 illustrates the method of detecting a failure occurring on a DH link. Each of the nodes #3 and #4 can recognize both of the state of the DH-related own link and that of the DH-related other link by providing the management path in the above-described manner.

That is, upon detecting a failure occurring in the DH-related own link (the link established between the nodes #3 and #X), the node #3 notifies the node #4 of the link failure via the OAM management section #2. Further, upon detecting a failure occurring in the DH-related own link (the link established between the nodes #4 and #X), the node #4 notifies the node #3 of the link failure via the OAM management section #2. The above-described failure notification may include information about an alarm indication signal (AIS), a port status type length value (TLV), and an interface status TLV, for example.

Figure 9:
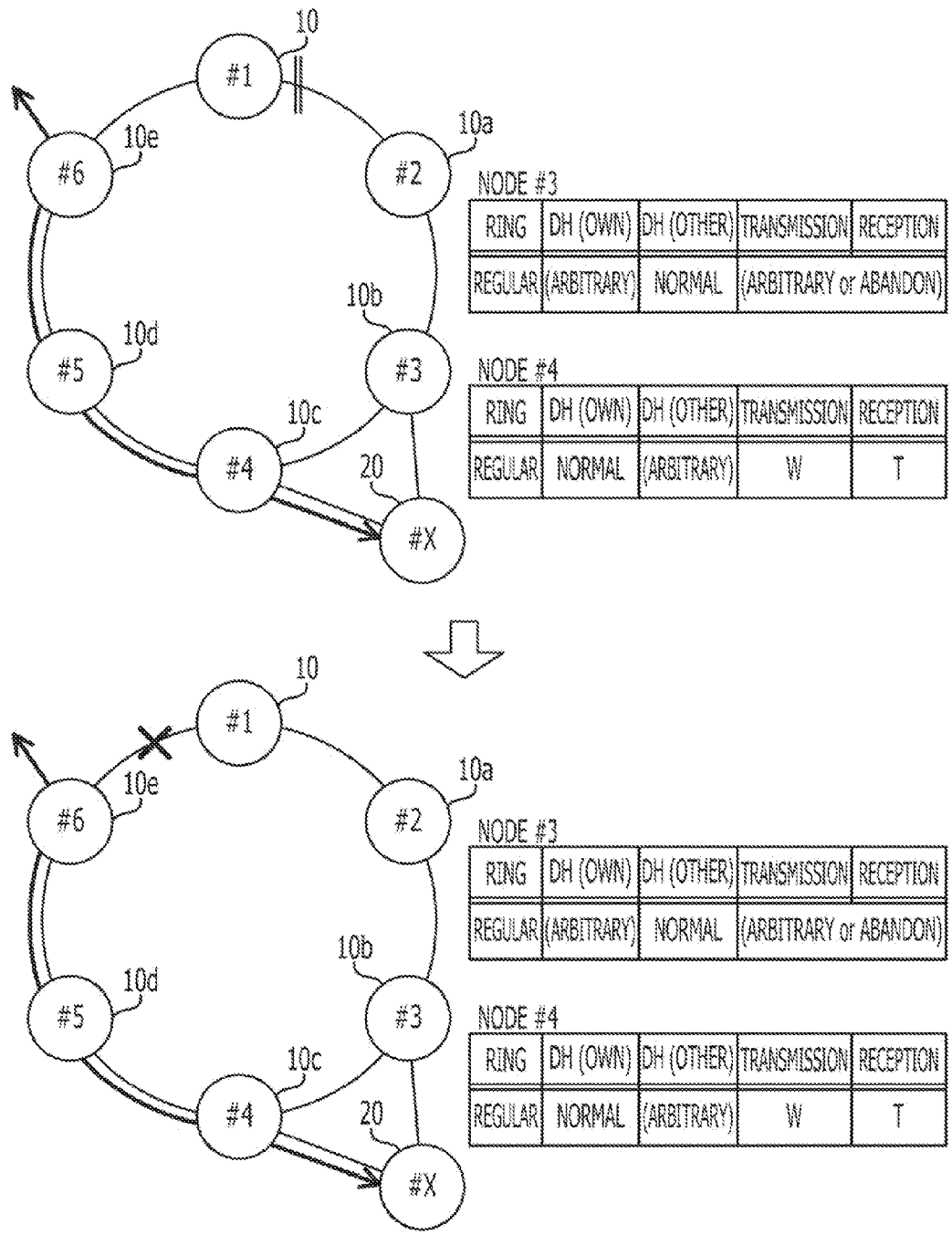
FIG. 9 illustrates a first example main signal-switching control performed according to the second embodiment.

FIG. 9 illustrates a first example main signal-switching control performed according to the second embodiment. When no failure occurs on the ring, a data frame (VID=a) addressed to the node #X is forwarded in the order of the node #6, the node #5, and the node #4. Likewise, a data frame (VID=a) transmitted from the node #X is forwarded in the order of the node #4, the node #5, and the node #6.

Upon receiving the data frame corresponding to the equation VID=a transmitted from the W direction in the state where no failure occurs, the node #4 forwards the data frame toward the T direction as illustrated in the upper part of FIG. 9. When transmitting the data frame corresponding to the equation VID=a, the node #X transmits the data frame to each of the nodes #3 and #4. Upon receiving the data frame corresponding to the equation VID=a transmitted from the T direction, the node #3 abandons the data frame, for example. Upon receiving the data frame corresponding to the equation VID=a transmitted from the T direction, the node #4 forwards the data frame toward the W direction.

When a failure occurs in the link established between the nodes #6 and #1 in that state, the node #6 transmits the failure notification-message data and the switching inhibit-message data toward the E direction. Upon receiving the failure notification-message data and the switching inhibit-message data that are transmitted via the node #5, the node #4 determines to retain the path state corresponding to the equation VID=a as the regular path state, and forwards the failure notification-message data and the switching inhibit-message data toward the E direction. The node #3 also receives the failure notification-message data and the switching inhibit-message data, and determines to retain the path state corresponding to the equation VID=a as the regular path state, as is the case with the node #4. Further, the node #1 (the master node) opens the BP.

As a consequence, the direction of forwarding the data frame corresponding to the equation VID=a, which is adopted by each of the nodes #3 and #4, is not changed as illustrated in the lower part of FIG. 9. That is, upon receiving the data frame corresponding to the equation VID=a after a failure occurs in the link established between the nodes #6 and #1, the node #3 abandons the data frame, for example. Upon receiving the data frame corresponding to the equation VID=a transmitted from the W direction, the node #4 forwards the data frame toward the T direction. Further, upon receiving the data frame corresponding to the equation VID=a transmitted from the T direction, the node #4 forwards the data frame toward the W direction.

Figure 10:
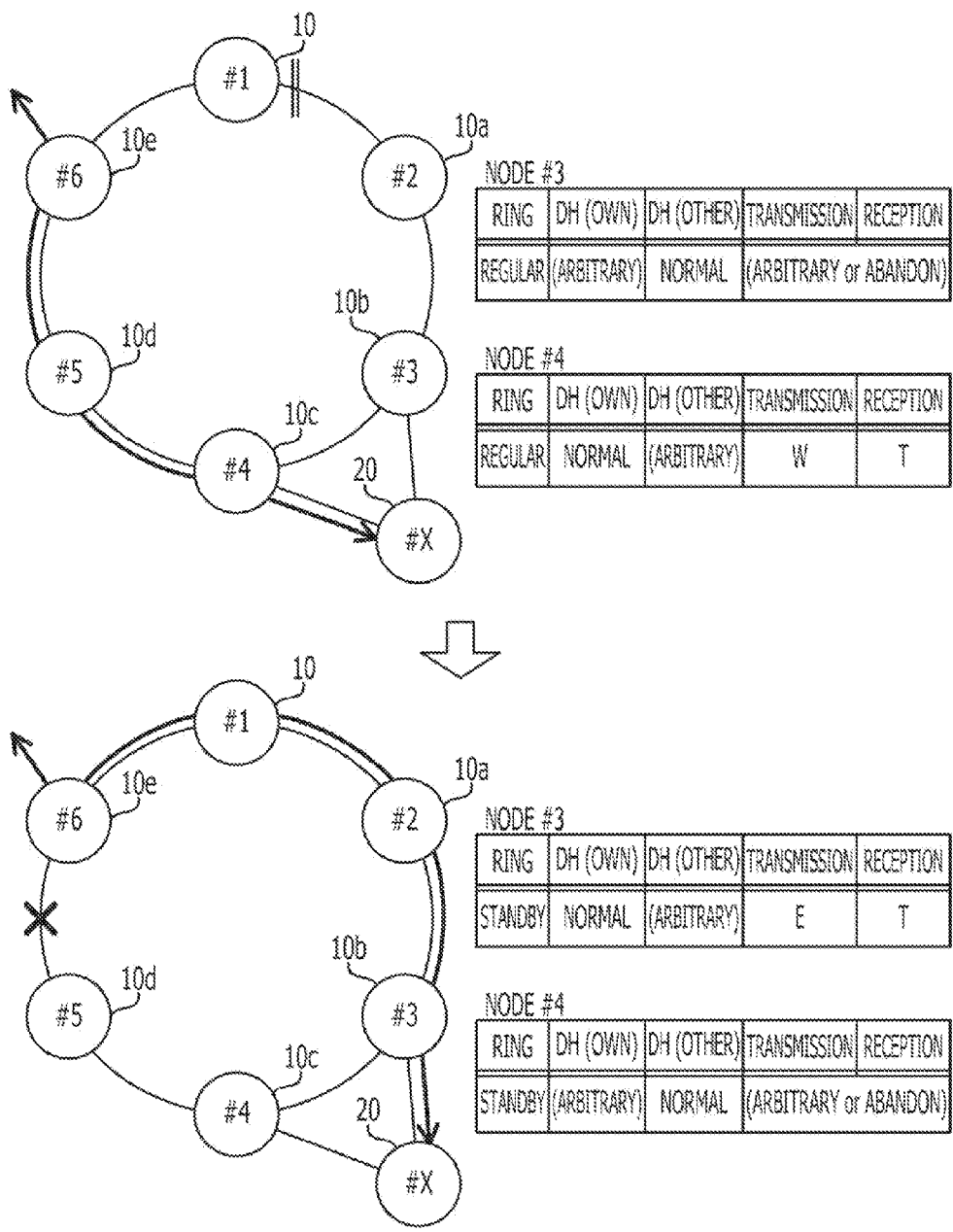
FIG. 10 illustrates a second example main signal-switching control performed according to the second embodiment.

FIG. 10 illustrates a second example main signal-switching control performed according to the second embodiment. In the state where no failure occurs, a data frame is forwarded in the same direction as that illustrated in FIG. 9.

When a failure occurs in the link established between the nodes #5 and #6 in that state, the node #5 transmits the failure notification-message data toward the E direction. However, the switching inhibit-message data is not transmitted. Upon receiving the failure notification-message data transmitted from the W direction, the node #4 determines to switch the path state corresponding to the equation VID=a over to the standby path state, and forwards the failure notification-message data toward the E direction. The node #3 also receives the failure notification-message data, and determines to switch the path state corresponding to the equation VID=a over to the standby state, as is the case with the node #4. Further, the node #6 transmits the failure notification-message data toward the W direction. Upon receiving the failure notification-message data, the node #1 opens the BP.

As a consequence, the direction of forwarding the data frame corresponding to the equation VID=a, which is adopted by each of the nodes #3 and #4, is changed as illustrated in the lower part of FIG. 10. That is, upon receiving the data frame corresponding to the equation VID=a after a failure occurs in the link established between the nodes #5 and #6, the data frame being transmitted from the E direction, the node #3 forwards the data frame toward the T direction. Further, upon receiving the data frame corresponding to the equation VID=a, the data frame being transmitted from the T direction, the node #3 forwards the data frame toward the E direction. Upon receiving the data frame corresponding to the equation VID=a, the node #4 abandons the data frame, for example.

Figure 11:
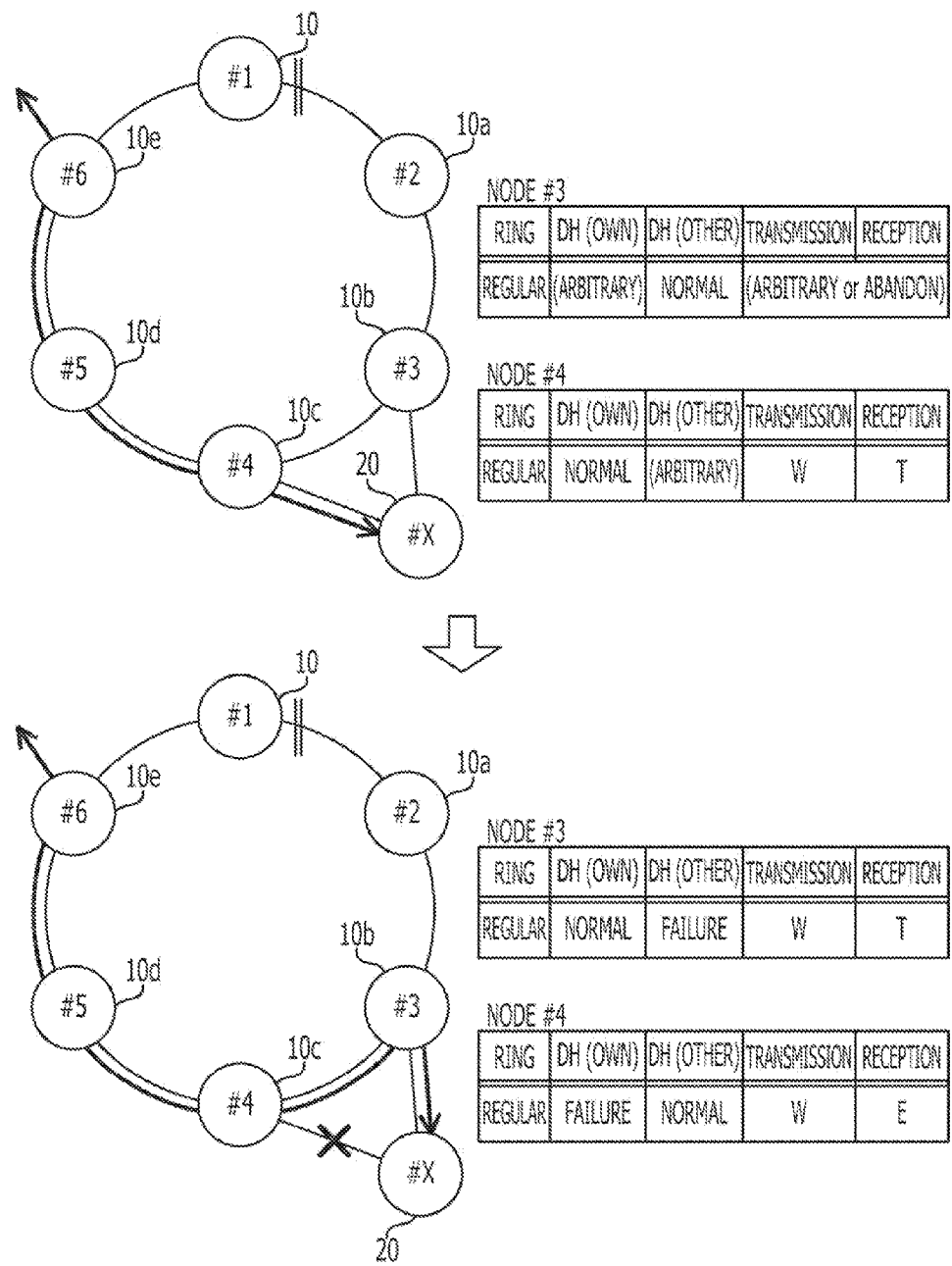
FIG. 11 illustrates a third example main signal-switching control performed according to the second embodiment.

FIG. 11 illustrates a third example main signal-switching control performed according to the second embodiment. In the state where no failure occurs, a data frame is forwarded in the same direction as that illustrated in FIG. 9.

When a failure occurs in the link established between the nodes #4 and #X in that state, the node #4 detects a failure occurring in a link determined to be its own link with respect to the DH connection, and transmits the failure notification-message data to the node #3 over a management path that had already been provided. The node #3 detects a failure from a link determined to be the other link with respect to the DH connection by referring to the failure notification message-data transmitted from the node #4. Since the detected failure occurs in a link established outside the ring, a ring protection function provided for paths provided on the ring does not operate, and the path state is retained as the regular path state.

As a consequence, the direction of forwarding the data frame corresponding to the equation VID=a, which is adopted by each of the nodes #3 and #4, is changed as illustrated in the lower part of FIG. 11. That is, upon receiving the data frame corresponding to the equation VID=a after a failure occurs in the link established between the nodes #4 and #X, the data frame being transmitted from the W direction, the node #3 forwards the data frame toward the T direction. Further, upon receiving the data frame corresponding to the equation VID=a, the data frame being transmitted from the T direction, the node #3 forwards the data frame toward the W direction. Upon receiving the data frame corresponding to the equation VID=a, the data frame being transmitted from the W direction, the node #4 forwards the data frame toward the E direction. Further, upon receiving the data frame corresponding to the equation VID=a, the data frame being transmitted from the E direction, the node #4 forwards the data frame toward the W direction.

Figure 12:
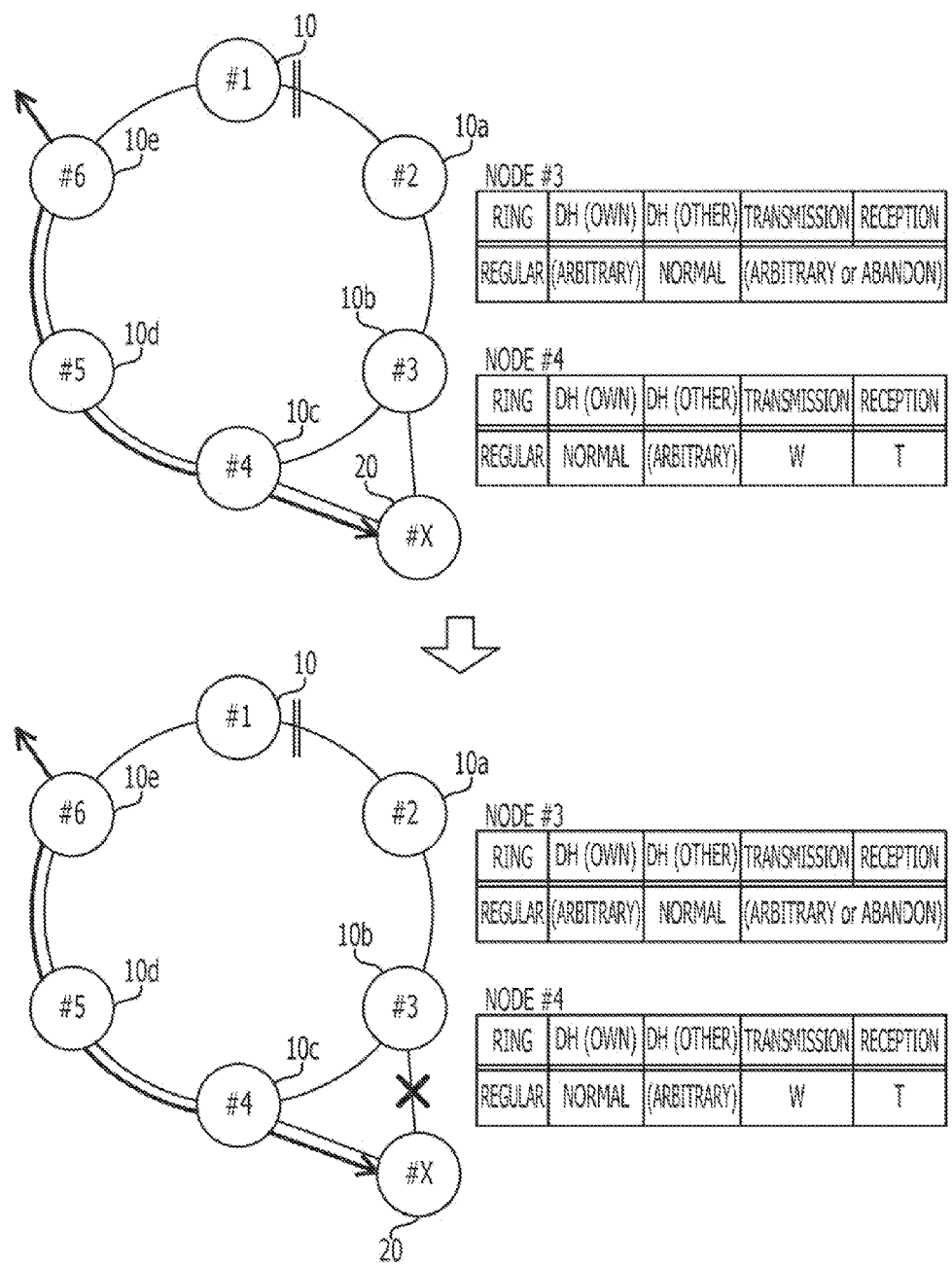
FIG. 12 illustrates a fourth example main signal-switching control performed according to the second embodiment.

FIG. 12 illustrates a fourth example main signal-switching control performed according to the second embodiment. In the state where no failure occurs, a data frame is forwarded in the same direction as that illustrated in FIG. 9.

When a failure occurs in the link established between the nodes #3 and #X in that state, the node #3 detects a failure occurring in the link determined to be its own link with respect to the DH connection, and transmits the failure notification-message data to the node #4 over a management path that had already been determined. The node #4 detects a failure from a link determined to be the other link with respect to the DH connection by receiving the failure notification-message data transmitted from the node #3. Since the detected failure occurs in a link established outside the ring, the ring protection function provided for a path provided on the ring does not operate, and the path state is retained as the regular path state.

As a consequence, the direction of forwarding the data frame corresponding to the equation VID=a, which is adopted by each of the nodes #3 and #4, is not changed as illustrated in the lower part of FIG. 12. That is, upon receiving the data frame corresponding to the equation VID=a after a failure occurs in the link established between the nodes #3 and #X, the node #3 abandons the data frame, for example. Upon receiving the data frame corresponding to the equation VID=a, the data frame being transmitted from the W direction, the node #4 forwards the data frame toward the T direction. Upon receiving the data frame corresponding to the equation VID=a, the data frame being transmitted from the T direction, the node #4 forwards the data frame toward the W direction.

The communication system according to the second embodiment allows for forwarding a data frame transmitted from an external node which is DH-coupled to a ring network through an appropriate route. That is, the communication system allows for substantially preventing the forwarding route from becoming a roundabout route and automatically switching the forwarding route over to a detour route when a failure occurs in a DH-coupled link. The communication system further allows for performing a protection control for the ring part and a failure-recovery control for the DH part in harmony so that an appropriate route control can be performed for the entire system. Accordingly, the communication system including the ring network may become more reliable.

Third Embodiment

Next, a third embodiment will be described. The description of the third embodiment will center on the difference between the second and third embodiments, and the descriptions of overlaps between the second and third embodiments will be omitted. In a communication system according to the third embodiment, a BP is provided between two DH-coupled nodes (corresponding to the nodes #3 and #4 illustrated in FIG. 2) that are provided on the ring and a data frame passes through the BP with difficulty.

The communication system according to the third embodiment may have a configuration which is basically the same as that of the second embodiment illustrated in FIGS. 2 and 3. According to the third embodiment, however, the node #3 is specified as a master node and a port of the node #3, the port facing toward the W direction, is determined to be the BP. Hereinafter, the third embodiment will be described by using the reference numerals and signs that are used in FIGS. 2 and 3.

FIG. 13 illustrates a first example forwarding table data 18c according to the third embodiment. The forwarding table data 18c is expected to be stored in a table storage unit (corresponding to the table storage unit 18) of the communication apparatus 10c. The forwarding table data 18c includes data organized into categories "PATH", "RING STATE", "DH STATE", "TRANSMISSION DIRECTION", AND "RECEPTION DIRECTION" as is the case with the above-described forwarding table data 18a.

According to the forwarding table data 18c, the node #4 forwards a data frame between the nodes #5 and #X when the regular path is retained and the link established between the nodes #X and #4 is under normal conditions. However, when the regular path is retained, the situation where a failure occurs between the nodes #X and #4, and the link established between the nodes #X and #3 is under normal conditions does not occur, as will be described later.

On the other hand, when the path state is changed over to the standby path state, and each of the links that are established between the nodes #X and #3, and the nodes #X and #4, respectively, is under normal conditions, the data frame may not be forwarded. When a failure occurs between the nodes #X and #3, and the link established between the nodes #X and #4 is under normal conditions, the data frame is forwarded between the nodes #3 and #X. When the above-described procedures are reversed, the data frame may not be forwarded. Incidentally, the BP of the node #3 is opened when the path state is changed over to the standby path state. The data frame may not be forwarded when each of the DH links is under fault conditions.

FIG. 14 illustrates a second example forwarding table data 18d according to the third embodiment. The forwarding table data 18d is expected to be stored in a table storage unit (corresponding to the table storage unit 18) of the communication apparatus 10b. The forwarding table data 18d includes data organized into categories "PATH", "RING STATE", "DH STATE", "TRANSMISSION DIRECTION", AND "RECEPTION DIRECTION", as is the case with the above-described forwarding table data 18b.

According to the forwarding table data 18d, the node #3 may not forward a data frame when the regular path is retained, and the link established between the nodes #X and #4 is under normal conditions. However, when the regular path is retained, the situation where a failure occurs between the nodes #X and #4, and the link established between the nodes #X and #3 is under normal conditions does not occur, as will be described later.

On the other hand, when the regular path is changed over to the standby path, and each of the links that are established between the nodes #X and #3, and the nodes #X and #4, respectively, is under normal conditions, the node #3 forwards the data frame between the nodes #2 and #X. When a failure occurs between the nodes #X and #3, and the link established between the nodes #X and #4 is under normal conditions, the data frame is forwarded between the nodes #2 and #4. When the above-described procedures are reversed, the data frame is forwarded between the nodes #2 and #X. When each of the DH links is under fault conditions, the data frame may not be forwarded.

Figure 15:
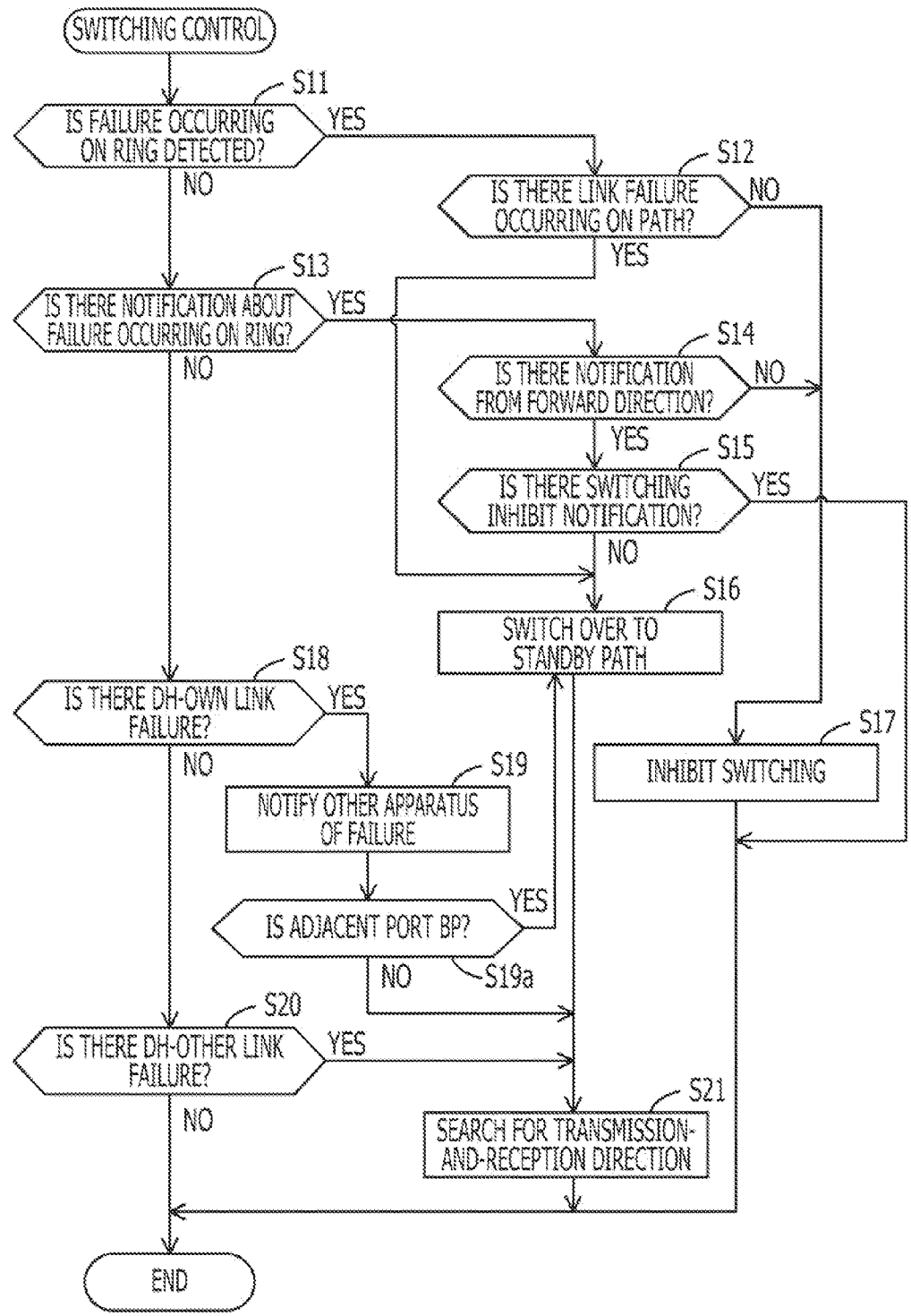
FIG. 15 is a flowchart illustrating a main signal-switching control performed according to the third embodiment.

FIG. 15 is a flowchart illustrating a main signal-switching control performed according to the third embodiment. The main signal-switching control is different from the main signal-switching control performed in the second embodiment illustrated in FIG. 6 in that operation (S19a) is performed between operations (S19) and (S21).

(Operation (S19a)) The communication apparatus 10c determines whether or not a port of the other apparatus (the node #3) that is installed on the ring and that pairs up with its own apparatus with respect to the DH connection, the port being provided on the own apparatus-side, is blocked (whether or not the port is the BP). When the port is blocked, the failure notification-message data is transmitted toward the direction opposite to that of the other apparatus, and the processing advances to operation (S16). At that time, the switching inhibit-message data is not transmitted. Accordingly, the path state is switched from the regular path state to the standby path state. When the port is not blocked, the processing advances to operation (S21).

Figure 16:
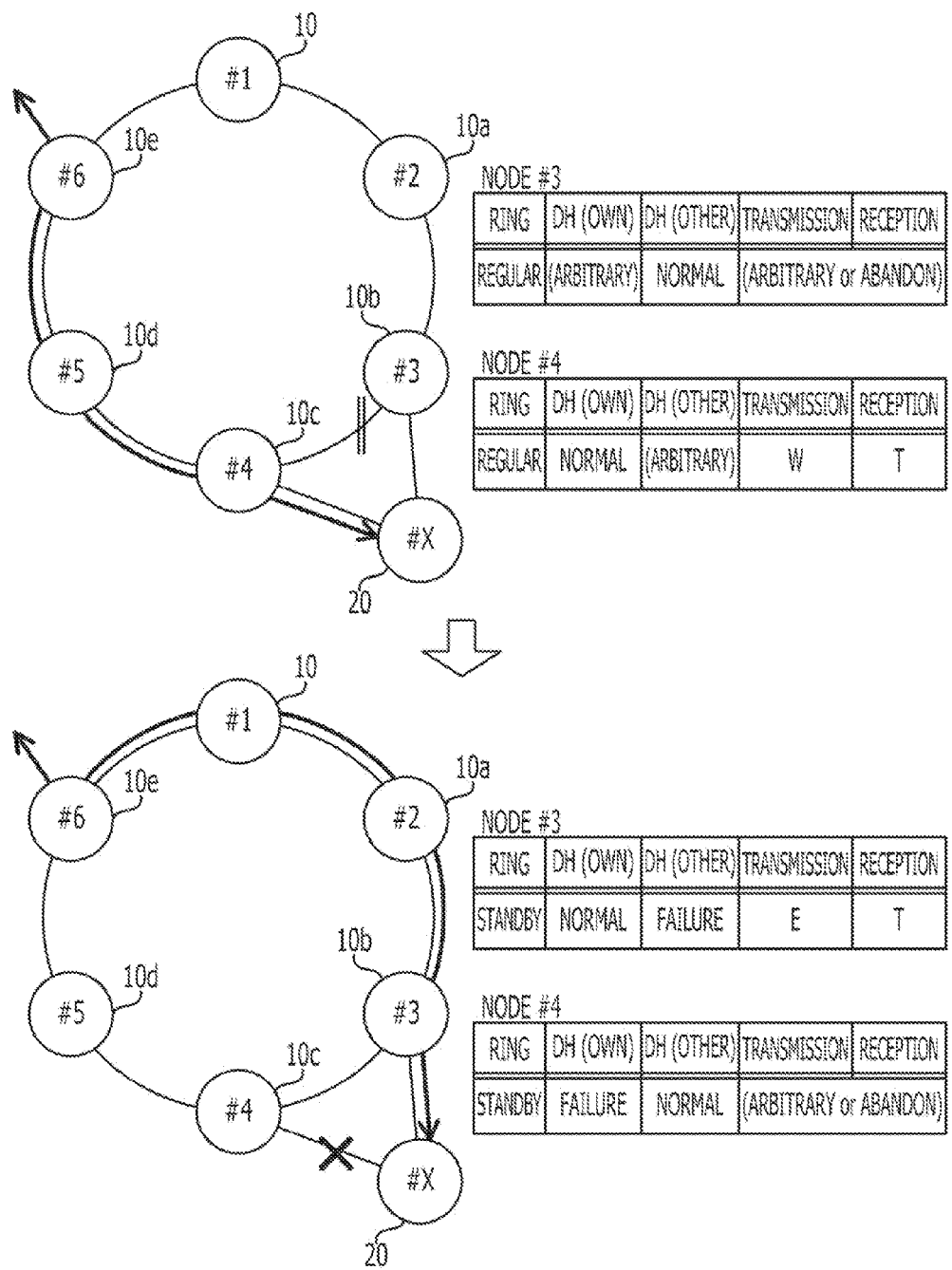
FIG. 16 illustrates an example main signal-switching control performed according to the third embodiment.

FIG. 16 illustrates an example main signal-switching control performed according to the third embodiment. When no failure occurs on the ring, a data frame (VID=a) addressed to the node #X is forwarded in the order of the node #6, the node #5, and the node #4. Likewise, a data frame (VID=a) transmitted from the node #X is forwarded in the order of the node #4, the node #5, and the node #6. Further, a port of the node #3, the port facing toward the W direction, is determined to be the BP.

When a failure occurs in the link established between the nodes #4 and #X in that state, the node #4 determines to switch the path state corresponding to the equation VID=a over to the standby path state, and transmits the failure notification-message data toward the W direction, because the node #4 is coupled to the node #3 (the master node) via the BP. The node #3 determines to switch the path state corresponding to the equation VID=a over to the standby path state, and opens the BP.

As a consequence, the direction of forwarding the data frame corresponding to the equation VID=a, which is adopted by each of the nodes #3 and #4, is changed as illustrated in the lower part of FIG. 16. That is, upon receiving the data frame corresponding to the equation VID=a, the data frame being transmitted from the E direction, after a failure occurs in the link established between the nodes #4 and #X, the node #3 forwards the data frame toward the T direction. Further, upon receiving the data frame corresponding to the equation VID=a, the data frame being transmitted from the T direction, the node #3 forwards the data frame toward the E direction. Upon receiving the data frame corresponding to the equation VID=a, the node #4 abandons the data frame.

The above-described communication system according to the third embodiment allows for achieving substantially the same effects as those of the second embodiment. Further, the communication system of the third embodiment may be configured so that a node provided outside the ring can be DH-coupled to a plurality of nodes straddling the BP. The communication system can also perform an appropriate route control in spite of the above-described configuration.

Fourth Embodiment

Next, a fourth embodiment will be described. The description of the fourth embodiment will center on the difference between the second and fourth embodiments, and the descriptions of overlaps between the second and fourth embodiments will be omitted. A communication system according to the fourth embodiment is achieved by modifying the configuration of the communication system according to the second embodiment illustrated in FIG. 2. The following communication systems are illustrated as first to third example modifications.

Figure 17:
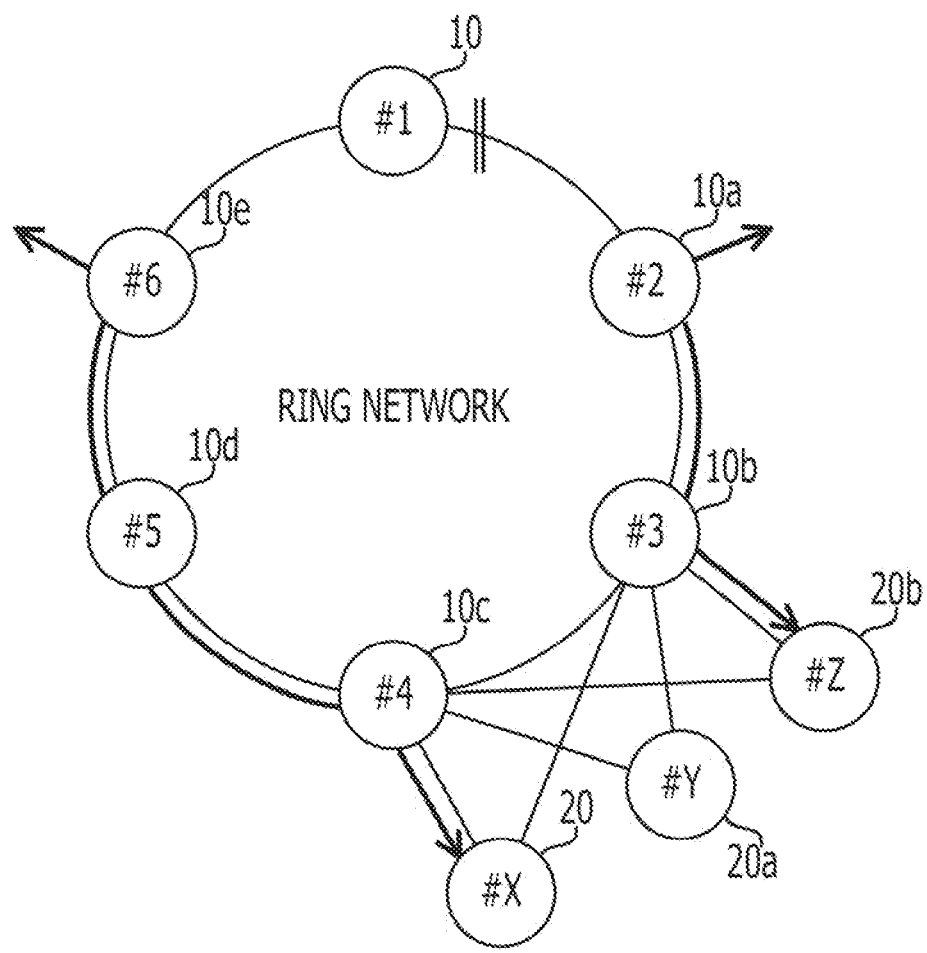
FIG. 17 illustrates a first example modification of a system configuration.

FIG. 17 illustrates the first exemplary modification of the system configuration. In a communication system illustrated in FIG. 17, communication apparatuses 20, 20a, and 20b (nodes #X, #Y, and #Z) are DH-coupled to the communication apparatuses 10b and 10c (the nodes #3 and #4) that are provided on the ring. In that case, virtual connections corresponding to the individual nodes #X, #Y, and #Z are established between the nodes #3 and #4, the virtual connections being established for each of the nodes #3 and #4. Further, forwarding table data of each of the nodes #3 and #4 specifies a port through which a data frame is input from and/or output toward the T direction. Accordingly, it becomes possible to perform route controls for the DH parts of the individual nodes #X, #Y, and #Z, independently of one another.

Figure 18:
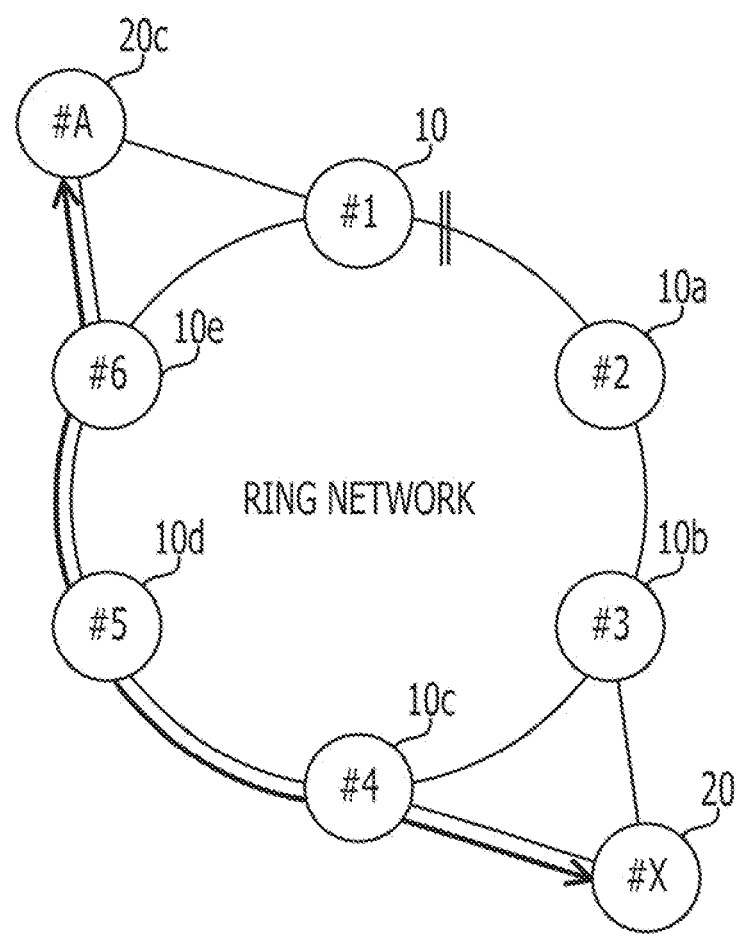
FIG. 18 illustrates a second example modification of the system configuration.

FIG. 18 illustrates the second example modification of the system configuration. In a communication system illustrated in FIG. 18, a communication apparatus 20c (a node #A) is further DH-coupled to the communication apparatuses 10e and 10 (the nodes #6 and #1) that are provided on the ring. In that case, each of the nodes #6 and #1 performs a route control for a DH part relating to the node #A independently of the route control performed for the DH part relating to the node #X. Thus, a data frame with a certain added VID can be forwarded via a plurality of DH links.

Figure 19:
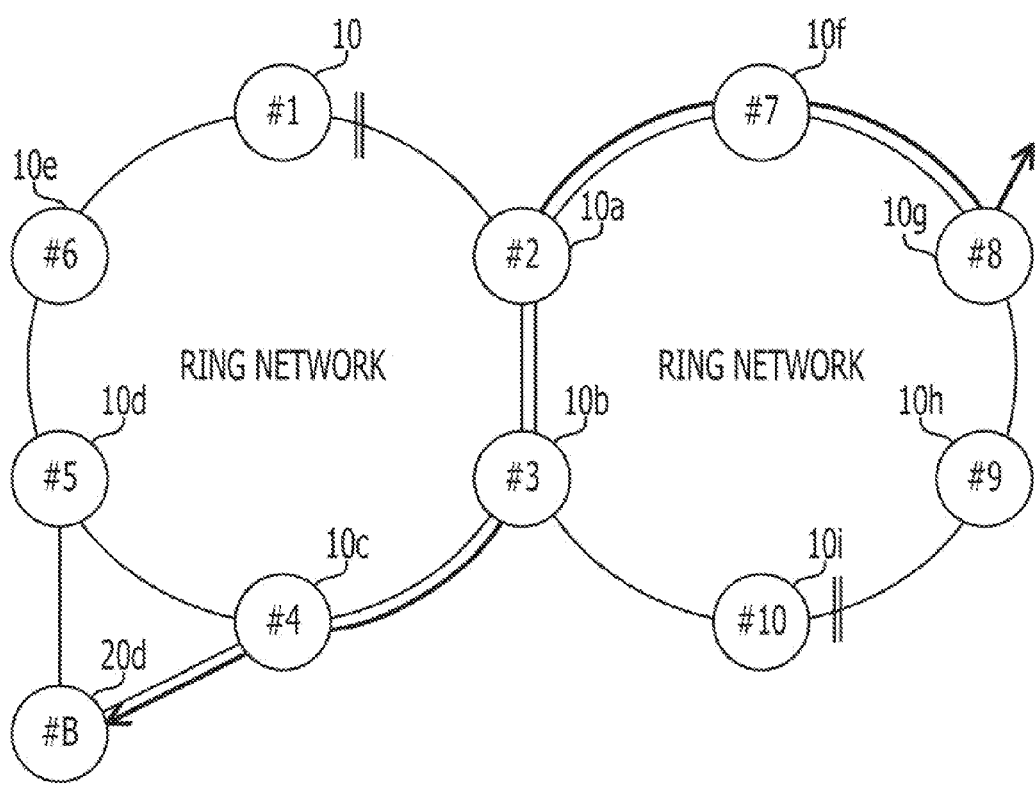
FIG. 19 illustrates a third example modification of the system configuration.

FIG. 19 illustrates the third example modification of the system configuration. According to a communication system illustrated in FIG. 19, a different ring network including communication apparatuses 10f, 10g, 10h, and 10i (nodes #7 to #10) is coupled to the ring network including the communication 10, 10a, 10b, 10c, 10d, and 10e (nodes #1 to #6). The nodes #2 and #3, and the link established there between are shared between the two rings. Further, a communication apparatus 20d (a node #B) is DH-coupled to each of the nodes #4 and #5 that are provided on the ring. Thus, a data frame with a certain added VID can be forwarded via a plurality of rings and a plurality of DH links.

The communication system having the above-described configuration according to the fourth embodiment also allows for achieving substantially the same effects as those of the second embodiment. Further, the communication system may be configured to perform the control described in the third embodiment so that a node provided outside the ring can be DH-coupled to a plurality of nodes straddling the BP.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has (have) been described in detail, it should be understood that the various changes, substitutions, and alterations could be made hereto without departing from the spirit and scope of the invention.

What is claimed is:

1. A first communication apparatus which is one of a plurality of communication apparatuses included in a ring network, the first communication apparatus comprising:
    a first network interface configured to be coupled to a second communication apparatus via a first link, the second communication apparatus being one of the plurality of communication apparatuses included in the ring network;
    a second network interface configured to be coupled to a third communication apparatus via a second link that is not included in the ring network, the third communication apparatus being outside the ring network and coupled to the second communication apparatus via a third link; and
    circuitry configured to
        monitor a network state indicating presence or absence of a failure occurring in the ring network, a first link state indicating presence or absence of a failure occurring in the second link, a second link state indicating presence or absence of a failure occurring in the third link, and information indicating a direction of forwarding data in the ring network; and
        determine whether to forward data to the third apparatus via the first link or the second link based on the information indicating the direction of forwarding data in the ring network, the first link state, and the second link state.

2. The communication apparatus according to claim 1, wherein the circuitry is configured to monitor the presence or absence of a failure occurring in each of the second link and the third link by setting a management path extending via a section of the first link, a section of the second link, and a section of the third link.

3. The communication apparatus according to claim 2, wherein the circuitry is configured to acquire a notification from the second communication apparatus on the management path, the notification indicating that a failure of the third link is detected at the second communication apparatus.

4. The first communication apparatus according to claim 1, wherein when the circuitry is configured to detect failure of the second link, detect that forwarding of the data is blocked in a section of the first link, and change the direction of forwarding data in the ring network.

5. The first communication apparatus according to claim 1, wherein the circuitry is configured to set the direction of forwarding data in the ring network to either a regular path state or a standby path state based on a failure condition of the links that are included in the ring network.

6. The first communication apparatus according to claim 1, wherein the first and second communication apparatuses are coupled not via any other communication apparatus, the first and third communication apparatuses are coupled not via any other communication apparatus, and the second and third communication apparatus are not coupled via any other communication apparatus.

7. The first communication apparatus according to claim 1, wherein the circuitry is configured to determine whether to forward data to the third apparatus via the first link or second link so that the data is not forwarded in a roundabout way.

8. A communication system comprising:
    a ring network that includes first and second communication apparatuses coupled via a first link of the ring network, and
    a third communication apparatus provided outside the ring network, the third communication apparatus coupled to the first communication apparatus via a second link that is not included in the ring network, and coupled to the second communication apparatus via a third link,
    wherein the first communication apparatus includes circuitry configured to monitor a network state indicating presence or absence of a failure occurring in the ring network,
    a first link state indicating presence or absence of a failure occurring in the second link, and a second link state indicating presence or absence of a failure occurring in the third link, and information indicating a direction of forwarding data in the ring network; and
    determine whether to forward data to the third apparatus via the first link or the second link, based on the information indicating the direction of forwarding data in the ring network, the first link state, and the second link state.

9. A communication method used for a communication system having a ring network that includes first and second communication apparatuses coupled via a first link of the ring network, and a third communication apparatus provided outside the ring network, the third communication apparatus coupled to the first communication apparatus via a second link that is not included in the ring network, and coupled to the second communication apparatus via a third link, the communication method comprising:
    monitoring a network state indicating presence or absence of a failure occurring in the ring network;
    monitoring a first link state indicating presence or absence of a failure occurring in the second link;
    monitoring a second link state indicating presence or absence of a failure occurring in the third link;
    monitoring information indicating a direction of forwarding data in the ring network; and
    determining whether to forward data to the third apparatus via the first link or the second link based on the information indicating the direction of forwarding data in the ring network, the first link state, and the second link state.

10. The communication method according to claim 9, further comprising:

monitoring the presence or absence of the failure occurring in each of the second link and third link by setting a management path extending via a section of the first link, a section of the second link, and a section of the third link.

11. The communication method according to claim 10, further comprising:

acquiring a notification from the second communication apparatus on the management path, the notification indicating that the failure of the third link is detected at the second communication apparatus.

12. The communication method according to claim 9, further comprising:

detecting the failure of the second link and detecting that forwarding of the data is blocked in a section of the first link; and changing the direction of forwarding data in the ring network when the failure of the second link is detected and that forwarding of the data is blocked in a section of the first link.

13. The communication method according to claim 9, further comprising:

setting the direction of forwarding data in the ring network to either a regular path state or a standby path state based on a failure condition of the links that are included in the ring network.

\* \* \* \* \*